United States Patent [19]

Chamberlin et al.

[11] Patent Number: 5,720,441
[45] Date of Patent: Feb. 24, 1998

[54] SPINNING REEL CASTING DISTANCE CONTROLLER

[76] Inventors: Ronald Alvin Chamberlin, 785 Lincoln Ave., San Jose, Calif. 95126; Donald Ray Chamberlin, 1880 Blackford Ln., San Jose, Calif. 95125

[21] Appl. No.: 727,129

[22] Filed: Oct. 8, 1996

Related U.S. Application Data

[63] Continuation of Ser. No. 342,535, Nov. 21, 1994, abandoned.

[51] Int. Cl.⁶ ..................................................... A01K 89/00
[52] U.S. Cl. ........................... 242/323; 242/292; 242/322
[58] Field of Search ............................. 242/243, 246, 242/239, 240, 292, 322, 311, 323, 224, 387, 419, 593; D22/138, 139; 24/20 CW, 20 R

[56] References Cited

U.S. PATENT DOCUMENTS

| | | |
|---|---|---|
| D. 378,397 | 3/1997 | Hydreos, Jr. |
| 513,630 | 1/1894 | Beard .................... 24/20 CW X |
| 1,254,571 | 1/1918 | Bosworth ............... 24/20 R X |
| 1,322,082 | 11/1919 | Bardsley ................ 24/20 CW X |
| 3,116,894 | 1/1964 | Rule ........................ 242/243 |
| 3,384,320 | 5/1968 | Hawk ..................... 242/311 X |
| 4,087,889 | 5/1978 | Ohba et al. ............ 24/20 CW X |
| 4,305,179 | 12/1981 | Sakurada ............... 24/20 CW X |
| 4,368,857 | 1/1983 | Jacob et al. ............ 242/246 |
| 4,558,535 | 12/1985 | Eldridge ................ 242/323 X |
| 5,244,165 | 9/1993 | Valentine et al. ..... 242/311 X |

*Primary Examiner*—Daniel P. Stodola
*Assistant Examiner*—William A. Rivera
*Attorney, Agent, or Firm*—Skjerven Morrill MacPherson Franklin & Friel; Thomas S. MacDonald

[57] ABSTRACT

An attachment for controlling the distance of a casting lure attached to an end of a fishing line, includes a pressure pad extending from and connected to at least a portion of a distal lip of a spinning reel spool. During casting of the lure and line, the line on each revolution of the reel passes along an outer surface of the pressure pad, such that the fisherman can press his casting finger on the line against the pressure pad with varying intermittent finger pressure to increase and decrease drag on the line as the line spools off the spool and passes over the pressure pad. This assures greater casting accuracy so that the lure will land at a desired landing spot.

12 Claims, 3 Drawing Sheets

SPINNING REEL CASTING DISTANCE CONTROLLER

This application is a continuation of application Ser. No. 08/342,535 filed Nov. 21, 1994, now abandoned.

FIELD OF THE INVENTION

This invention relates to spin casting reels, more specifically the invention is directed to a fishing reel for controlling the occurrence and specifically the distance of the cast.

BACKGROUND OF THE INVENTION

There are two general categories of fishing reels that have evolved over the years (excluding fly fishing equipment). The earliest reels were known as "Level Wind" or "Bait Casting" reels. The latter name is the most common in use today and will be used herein to designate that particular type of reel. One of the main desirable features of the bait casting reel is that the operator (fisherman) can control the distance of his cast by placing his thumb directly onto the spool of line while the cast is in process. The term "fisherman" as used herein includes women as well as men. This allows slowing of the lure's progress based on the amount of pressure applied to the spooled line allowing the fisherman to more controllably slow and stop the lure where he wants it.

To gain a desirable "slow and stop" feature of the bait casting reel the fisherman is faced with several very undesirable operating characteristics. First, due to the inertia of the spool it is necessary to use fairly heavy lures or baits for casting those distances of interest to the fisherman. Second, a very long and exerting arm motion must be used by the fisherman to make a long cast with this type of reel. Probably the very least desirable feature of the bait casting reel is the commonly encountered "Backlash" phenomena. Backlash is created when the spool is revolving faster than the line is being pulled off by the lure in motion (being casted) causing the line to violently tangle or snarl around the spool.

Some time later in development emerged the "Spinning Reel" which includes a reel bail. The spinning reel offered two main advantages over the bait casting reel. These advantages are the added ability to cast a very light lure or bait a much greater distance than is achievable with bait casting reels with no "Backlash". With that gain, however, came a very large loss. With spinning reels there is no way to controllably and accurately slow or stop the progress of the lure during the cast (as there is with bait casting reels as described above). There are currently two methods employed by fisherman to attempt to control the distance of their cast when using a spinning reel. One method is to turn the handle of the reel which causes the reel bail to flip down, stopping the line and therefore the progress of the lure. The second method involves reaching forward of the reel with one's other hand and grabbing the line and therefore stopping the progress of the lure. Neither of these methods offer any real control of the distance as the lure is being stopped suddenly while traveling at full speed. This makes estimating where the lure will actually end up very difficult. Further when the lure is suddenly and abruptly stopped at high speed, the fishing rod tip is pulled forward from the momentum of the lure in motion which then causes the rod tip to rebound backwards literally jerking the lure back towards the user. This effect makes it almost impossible to stop the lure and have it land even close to where it was intended.

There has been a dramatic increase in recent years in the number of sport and professional bass fisherman. One of the main requirements for successfully catching the bass variety of fish is the ability to place the lure precisely where a user desires. Accurate casting minimizes having the lure and hook becoming hung up on an obstruction and maximizes the chance of the lure being placed in proximity to the bass. As a result many fisherman have gone back to using a bait casting reel for bass fishing mainly for the better distance control available from that style of reel.

There has been a need to bring better distance control while using a spinning reel and to have a spinning reel which would find increased popularity with bass fisherman.

SUMMARY OF THE INVENTION

The present invention provides a spinning reel attachment which gives distance control i.e. an ability to slow and or stop the casted object at will. The result is better control and accuracy not previously available with spinning reels while still retaining the non-backlash feature of these reels and a lighter lure capability.

Accuracy of a cast is considered by bass fisherman to be extremely important. Accuracy of lure placement has two basic components. One is the desired placement of the lure in the "X Axis" i.e. left or right and the other is in the "Y Axis" i.e. forward or back. The ability to control distance (i.e. location forward or back) is an important factor in lure control and accuracy. Placing the lure or bait exactly where one wants it, will eliminate getting hung up on brush, weeds, trees, or other obstructions in proximity to where the fisherman "suspects" a fish to be. Not getting "Hung Up" will also allow the fisherman to spend more prime time fishing, and not wasting his time untangling the lure from the brush or disturbing the fishing area by having to move a boat into the area to retrieve the lure.

The spin casting distance control of this invention can be attached to any standard spinning reel spool, allowing the fisherman to conveniently and controllably effect the distance of his cast, resulting in a dramatic increase in accuracy never before attainable with spinning reels. Increasing accuracy will yield more fish for the fisherman due to the accurate placement of the lure where the fisherman expects a fish to be and less time wasted in getting hung up.

The present invention provides a casting distance control using a standard casting rod and spinning reel, the latter including a fishing line-carrying spool which has a distal lip confining spooled turns of fishing line. The spooled turns initially represent all the length of the fishing line other than that length extending from the reel along guides on the fishing rod to the line end on which is attached the usual casting lure, or weight and/or hook. A pressure pad, in the form of an attachment to or integral with the spool distal end overlies a portion of the distal lip, more particularly a segment or substantially all of the distal peripheral edge of the distal lip. The pressure pad is fixedly connected to the spool distal end. The pressure pad is positioned so that the fishing line, spooling off the spool during the forward movement of the fishing rod tip during the casting procedure, on each revolution off the spool passes along an outer surface of the pressure pad. The fisherman then can press his casting finger against the pressure pad with the line therebetween, so as to exert a momentary drag on the spool-exiting line as long as the casting finger remains on the exiting line. The amount of drag is dependent on the amount of pressure applied by the casting finger and on the duration of time the pressure is applied. This is done when the lure and weight are approaching a desired landing zone on the water where a fish is sought. Increased drag will cause the casted lure to slow its forward progress thus permitting the lure to strike a landing spot closer than would have been the case without such drag. If during this action the fisherman judges that he has slowed the lure's progress enough, he will then remove his casting finger from the pad or lessen the pressure on the pad, and the casted lure will continue its forward motion at the then current velocity from the inertia of the lure and weight imposed by the forward motion of the rod tip. In various embodiments, the pressure pad can be connected to the spool distal end by a gapped or ungapped ring extending around the distal end in an interference fit or adhesively bonded thereto. In another embodiment, the pressure pad is a ring portion cantilevered from the spool distal end with a second integral ring portion in an interference fit or adhesively bonded to the cylindrical peripheral edge of the spool distal end. In another embodiment, the pressure pad is a button-like pad which can be adhesively-mounted on the outer peripheral edge of the spool distal lip.

The increased distance control attainable by adding the spin cast distance controller of the invention to a standard spinning reel will be equivalent to that attainable by a bait casting reel. In addition, the so-modified spinning reel will yield also the benefits inherent in the spinning reel. These include longer distance capability, less effort to cast, no backlash and the opportunity to use light lures or bait. With the spin cast controller attachment of the invention attached to a spinning reel a much higher degree of casting accuracy is attainable by the fisherman. As a result more fish should be caught.

DETAILED DESCRIPTION

Figure 1:
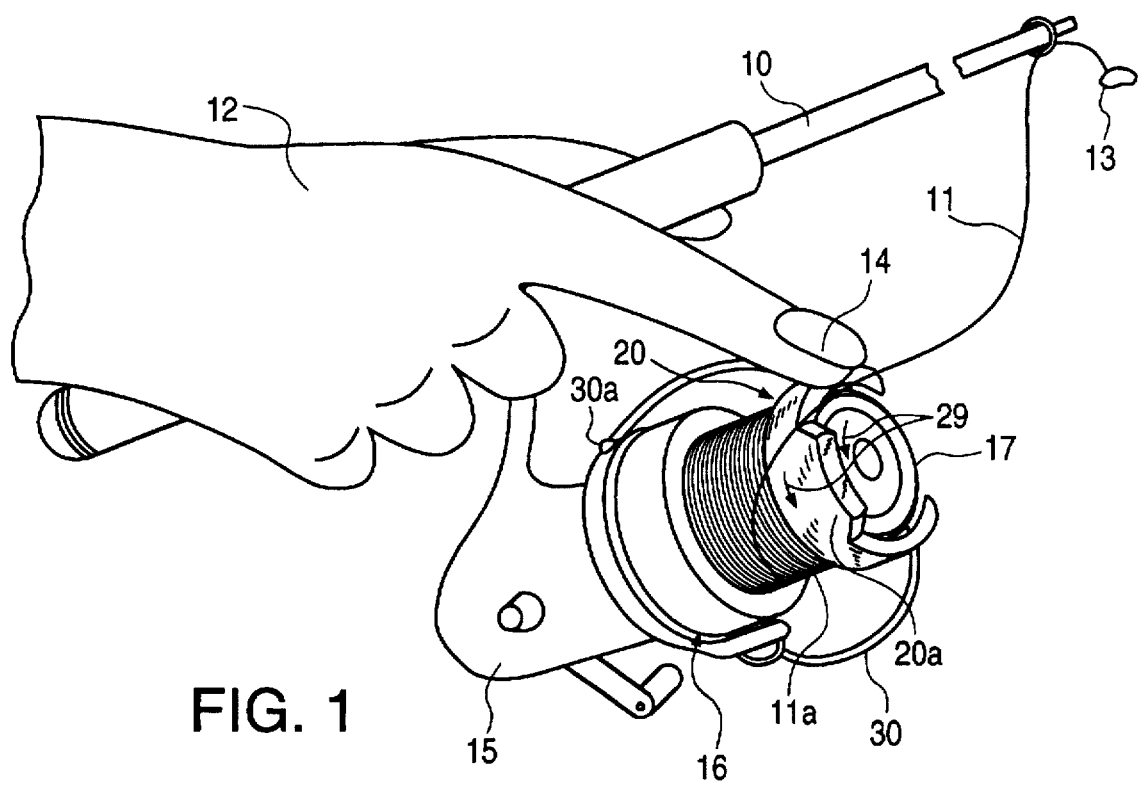
FIG. 1 is a perspective view of the invention in conjunction with the other operational components of a fishing rod and spinning reel.
Figure 2:
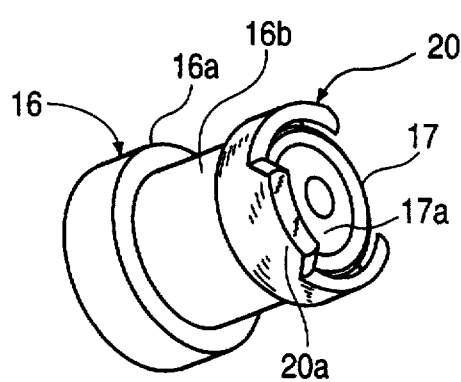
FIG. 2 is a perspective view of the invention on a spinning reel in its preferred embodiment.
Figure 3:
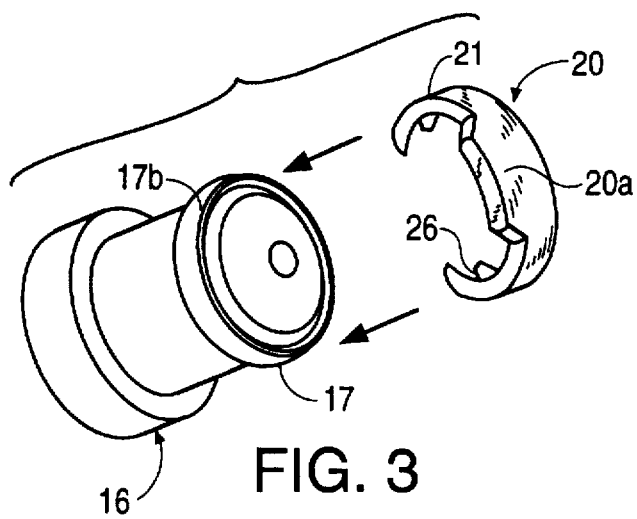
FIG. 3 is an exploded perspective view thereof.

FIGS. 1-3 show a pressure pad attachment 20 secured to a standard spinning reel spool 16 of a spinning reel 15. Specifically, the pressure pad attachment 20 is attached to a spool distal lip 17 (FIG. 3) of a standard spinning reel spool 16. The pressure pad attachment 20 is secured to the distal lip 17 by a clasping effect i.e. an interference fit resulting from the circular shape and U-shaped cross-section 26 of a clasp ring 21 and the circular matching shape of the spool lip 17 creating an interlocking effect. The spool distal lip 17 is of a slightly larger diameter than that of the attachment and this creates a tensioning effect between the clasp ring 21 and the spool lip 17 resulting in a fairly high degree of friction created between the two parts adding to the security of the attachment. The attachment can fit most sizes of spinning reels, i.e. most diameters and lip thicknesses of the distal lip 17 of such reels. The attachment 20 includes an integral pressure pad 20a which extends outwardly from a segment of clasp ring 21. "Outwardly" as used herein means that the pressure pad extends in a direction parallel to the spin axis of the reel and from the outer distal end 17a of the reel. The pad width is the same as the ring width W. (FIG. 4)

In operation, the fisherman proceeds in the usual manner for making a cast. These procedures include grabbing the fishing line 11 (FIG. 1) with the fisherman's casting finger 14. Then with the other hand rotating the bail 30 back on its pivot points 30a until the bail locks in the "open" or "casting" position. The next step is to actually make the cast by drawing the fishing rod 10 in an upward and backward motion and then with increased effort moving the rod in the forward direction. At some point during the forward motion of the fishing rod 10 the fisherman releases his hold on the fishing line 11. At this point the momentum of the fishing lure 13 carries the lure forward, pulling the multi-turns 11a of the fishing line 11 off the spool 16. As the fishing line 11 is "spooling" off of the spool 16 it will be found that the fishing line rubs slightly on the underneath side of the clasp ring 21. Typically, the fishing line 11 "spools" off of the spool 16 in a counter clockwise direction. There is a brief period of time when the fishing line 11 is no longer touching the clasp ring 21. This occurs when the fishing line 11 in its counter clockwise motion of "spooling" off the spool, encounters the gap 22 in the clasp ring 21 at a ramp trailing edge 24 (FIG. 4) and a ramp leading edge 23. When the line 11 (FIG. 1) encounters the ramp trailing edge ramp 24, it is smoothly and gently allowed to contact the exposed portion of the spool distal lip 17. After a short distance of travel, the line 11 will encounter the ramp leading edge ramp 23. When the line 11 encounters the ramp leading edge 23, it continues "spooling" off the spool 16 unaffected by this transition.

Each revolution of the fishing line 11 causes the line to pass momentarily in front of the pressure pad (arrows 29- FIG. 1) 20a which in the FIGS. 1-6 embodiment is a curved tab. The fisherman, deciding that his lure will continue beyond the desired landing spot if something isn't done, will make contact with his casting finger 14 on the pressure pad 20a. This will result in the fishing line 11 passing between his casting finger 14 and the pressure pad 20a. As a result, a momentary increase of drag will be created on the fishing line 11 as it "spools" off of the spool 16. The amount of drag created will be in direct ratio of how much finger pressure is applied by the fisherman's casting finger 14. This increased drag will cause the casted lure to slow its forward progress. The lure's forward progress will be effected by how much pressure is applied by the casting finger 14 against the pressure pad 20a and the duration of time the pressure is applied. If during this action the fisherman decides he has slowed the lure's progress enough he will remove his casting finger from making contact with the pressure pad. This will terminate the drag effect created on the line and the casted lure will continue its forward motion at the then current velocity to arrive at a desired location on the water surface.

Figure 4:
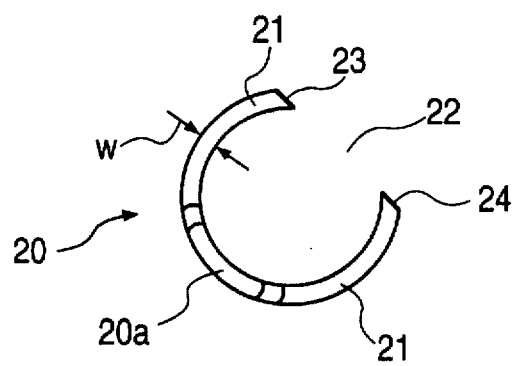
FIG. 4 is a plan view of the attachment of the invention.
Figure 5:
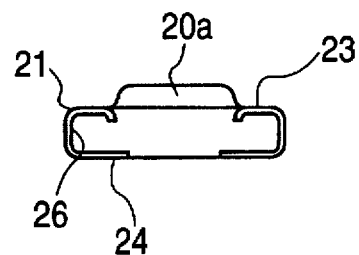
FIG. 5 is a rear view thereof.
Figure 6:
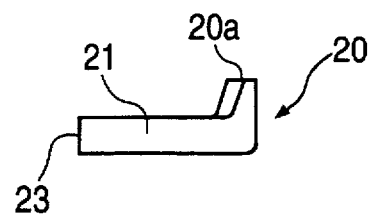
FIG. 6 is a side view thereof.

FIGS. 4-6 show the detailed shapes of the pressure pad 20a and ring 21 of the attachment 20. The invention, although constructed as a single unit of one-piece molded construction, is comprised of three distinct parts. In the preferred embodiment, the pressure pad 20a is about ½ inch high and 1 inch wide, the clasp ring 21 which is "U" shaped in configuration is about ¼ inch across. The overall ring diameter is approximately 1½ inches and the general shape is that of a hollow ring. The circumference, however, is broken at the two points forming an open-ended ring shape having a gap 22 at the ramp leading edge 23 and the ramp trailing edge 24. Ramp leading edge 23 is formed by a taper starting at the underside of the clasp ring 21 continuing upwards and at an angle of about 45° with respect to a radius of the clasp ring for a distance in the horizontal direction of about ¼ inch. The pressure pad and clasp ring may be made from various materials including, but not limited to rubber, plastics, silicones, or the like. Due to formability and the requirements of flexibility, a plastic material, such as ABS or polypropylene plastic is preferred. The higher the pad 20a is the better so that the user's fingers can more quickly "feel" the pad area over which the line is sweeping on each rotation of the reel. This results in needing less precision by the user in placing the finger properly. Height, however, is limited to less than about ½" (¾" in some reels) from the clasp ring bottom to the pad top, so as to avoid interference with the pivoting bail.

Figure 7:
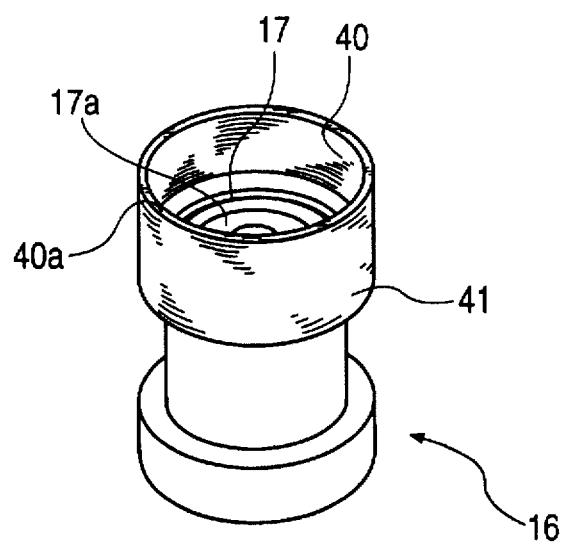
FIG. 7 is a perspective view of another embodiment of the attachment on a spinning reel.

In the FIG. 7 embodiment, a pressure pad is in the form of a complete raised ring section 40 extending cantilevered from an integral ring portion 41 extending around the complete circumference of the spool lip 17. The operator will press the fishing line 11 between his finger 14 and the cantilevered end surface 40a of the ring section 40.

Figures 8, 9:
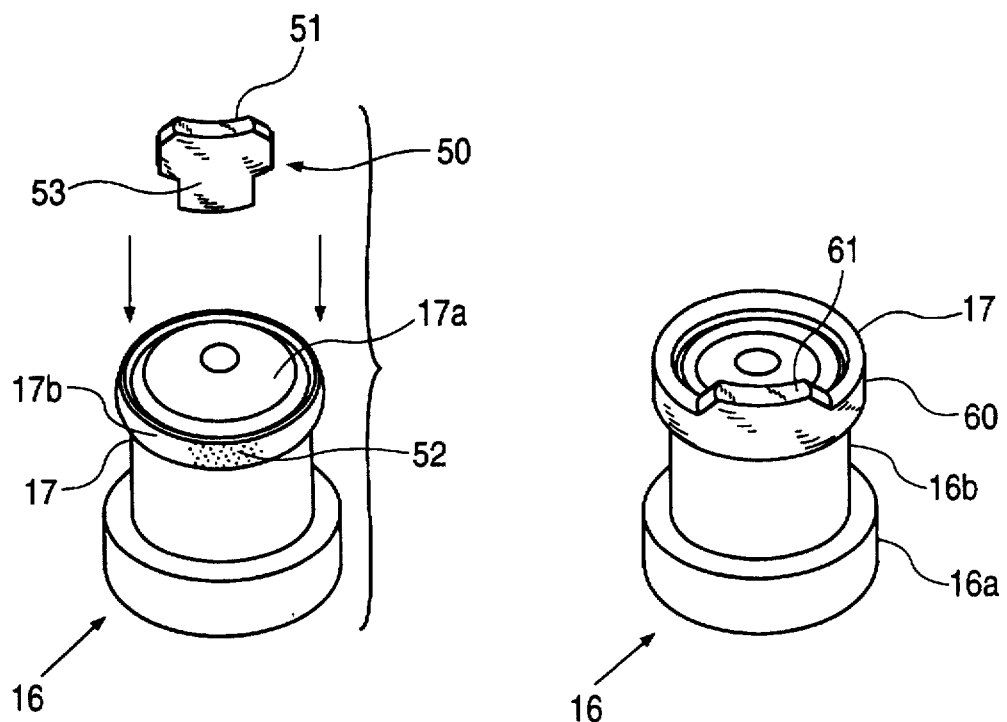
FIG. 8 is an exploded perspective view of yet another embodiment of the attachment on a spinning reel.
FIG. 9 is a perspective view of yet another embodiment of the invention as an integral part of a spinning reel.

FIG. 8 shows a further embodiment where a curved button-like pressure pad attachment 50 generally semi-circular in configuration includes a pressure pad 51 and a mounting tab 53. The tab 53 is affixed on the peripheral edge surface 17b by adhesive 52 on distal lip 17.

In FIG. 9, the pressure pad 61 and ring 60 is similar to the FIGS. 1–6 embodiment but without the ring gap and taper edges. The integrally molded pad and ring is of one-piece construction with the distal end 17 of spool 16 and is assembled to the central spool portion 16b and the other spool end 16a.

The above description of embodiments of this invention is intended to be illustrative and not limiting. Other embodiments of this invention will be obvious to those skilled in the art in view of the above disclosure.

We claim:

1. In combination, a fishing rod, a spinning reel including a fishing line-carrying spool having a spin axis, said reel being attached to said rod, a fishing line spooled on the spool and a casting lure at a distal end of the fishing line, wherein the spool includes a distal lip confining spooled turns of the fishing line, and means for controlling a casting distance of the casting lure upon a forward casting motion of the rod, said means comprising a separate pressure pad attachment including a pressure pad and a clasp ring section for fixedly connecting the pressure pad attachment around an outer peripheral edge of said spool distal lip, said pressure pad extending in a direction parallel to the spin axis of the spool and axially outwardly from said spool distal lip, and wherein said pressure pad is located such that during casting of said casting lure and said fishing line, said fishing line on each revolution off said reel passes along an outer surface of said pressure pad, whereby a casting person manually presses a casting finger on said fishing line against said pressure pad with varying intermittent finger pressure to increase and decrease drag on the fishing line as the fishing line spools off the spool and passes over said pressure pad, such that the casting lure will land at a desired distance.

2. In combination, a fishing rod, a spinning reel including a fishing line-carrying spool, said reel being attached to said rod, a fishing line spooled on the spool and a casting lure at a distal end of the fishing line, wherein the spool includes a distal lip confining spooled turns of the fishing line, and means for controlling a casting distance of the casting lure upon a forward casting motion of the rod, said means comprising a pressure pad attachment including a pressure pad fixedly secured to a portion of said spool distal lip and means for connecting the pressure pad attachment to said spool distal lip, and wherein said pressure pad is located such that during casting of said casting lure and said fishing line, said fishing line on each revolution of said reel passes along an outer surface off said pressure pad, whereby a casting person manually presses a casting finger on said fishing line against said pressure pad with varying intermittent finger pressure to increase and decrease drag on the fishing line as the fishing line spools off the spool and passes over said pressure pad, such that the casting lure will land at a desired distance; and wherein said pressure pad comprises a tab extending outwardly from a portion of a distal peripheral end of said spool distal lip and said means for connecting comprises a clasp ring integral with said pressure pad and fixedly extending around at least a majority of an outer peripheral edge of said spool distal lip.

3. The combination of claim 2 wherein said clasp ring includes a first distal end including a ramped leading edge and a second distal end including a ramp trailing edge, and a spaced gap between said ring distal ends such that the fishing line encounters said leading edge to urge the fishing line against said spool distal lip at said spaced gap.

4. In combination, a fishing rod, a spinning reel including a fishing line-carrying spool, said reel being attached to said rod, a fishing line spooled on the spool and a casting lure at a distal end of the fishing line, wherein the spool includes a distal lip confining spooled turns of the fishing line, and means for controlling a casting distance of the casting lure upon a forward casting motion of the rod, said means comprising a pressure pad attachment including a pressure pad fixedly secured to a portion of said spool distal lip and means for connecting the pressure pad attachment to said spool distal lip, and wherein said pressure pad is located such that during casting of said casting lure and said fishing line, said fishing line on each revolution off said reel passes along an outer surface of said pressure pad, whereby a casting person manually presses a casting finger on said fishing line against said pressure pad with varying intermittent finger pressure to increase and decrease drag on the fishing line as the fishing line spools off the spool and passes over said pressure pad, such that the casting lure will land at a desired distance; and wherein said pressure pad comprises a first ring section extending cantilevered outwardly from said spool distal lip and said means for connecting comprises an integral second ring section in an interference fit with an outer peripheral edge of said spool distal lip, such that the first ring section is intermittently pressed by the casting finger against the fishing line passing over said first ring section of said pressure pad with the varying intermittent finger pressure.

5. In combination, a fishing rod, a spinning reel including a fishing line-carrying spool, said reel being attached to said rod, a fishing line spooled on the spool and a casting lure at a distal end of the fishing line, wherein the spool includes a distal lip confining spooled turns of the fishing line, and means for controlling a casting distance of the casting lure upon a forward casting motion of the rod, said means comprising a pressure pad attachment including a pressure pad fixedly secured to a portion of said spool distal lip and means for connecting the pressure pad attachment to said spool distal lip, and wherein said pressure pad is located such that during casting of said casting lure and said fishing line, said fishing line on each revolution of said reel passes along an outer surface off said pressure pad, whereby a casting person manually presses a casting finger on said fishing line against said pressure pad with varying intermittent finger pressure to increase and decrease drag on the fishing line as the fishing line spools off the spool and passes over said pressure pad, such that the casting lure will land at a desired distance; and wherein said pressure pad attachment comprises a curved tab extending from a distal peripheral edge of said spool distal lip and a mounting tab and said means for connecting comprises an adhesive for affixing the mounting tab to said spool distal lip.

6. An attachment for affixation to a spinning reel, the reel including a fishing line-carrying spool wherein the spool contains a distal lip confining spooled turns of a fishing line, said attachment being sized and positioned for controlling the casting distance of a casting lure attached to an end of the fishing line during a forward casting motion of a fishing rod containing the spool, said attachment comprising:

a pressure pad of one-piece construction having a curved first portion sized and curved to coaxially surround at least a portion of the distal lip to which the attachment is to be fixedly attached and an integral second portion extending laterally from said first portion and sized to extend outwardly from the distal lip to which the attachment is to be fixedly secured and means for connecting said first portion to the distal lip, and wherein during casting of the lure and the line, the line passes along an outer surface of said second portion, whereby a casting operator presses a casting finger on the line against said second portion, with varying intermittent finger pressure to increase and decrease drag on the line as the line spools off the spool, such that the lure will land at a desired distance; and wherein said second portion comprises a curved tab adapted to extend from a portion of an outer peripheral edge of the distal lip and said means for connecting comprises a U-shaped clasp ring forming part of said first portion and fixedly extending around at least a majority of an outer peripheral edge of the distal lip.

7. An attachment for affixation to a spinning reel, the reel including a fishing line-carrying spool wherein the spool contains a distal lip confining spooled turns of a fishing line, said attachment being sized and positioned for controlling the casting distance of a casting lure attached to an end of the fishing line during a forward casting motion of a fishing rod containing the spool, said attachment comprising:

a pressure pad of one-piece construction having a curved first portion sized and curved to coaxially surround at least a portion of the distal lip to which the attachment is to be fixedly attached and an integral second portion extending laterally from said first portion and sized to extend outwardly from the distal lip to which the attachment is to be fixedly secured and means for connecting said first portion to the distal lip, and wherein during casting of the lure and the line, the line passes along an outer surface of said second portion, whereby a casting operator presses a casting finger on the line against said second portion, with varying intermittent finger pressure to increase and decrease drag on the line as the line spools off the spool, such that the lure will land at a desired distance; and wherein said first portion comprises a first closed ring adapted to extend cantilevered outwardly from the distal lip and said second portion and said means for connecting comprise an integral second closed ring sized to be in an interference fit with an outer peripheral edge of the distal lip.

8. An attachment for affixation to a spinning reel, the reel including a fishing line-carrying spool wherein the spool contains a distal lip confining spooled turns of a fishing line, said attachment being sized and positioned for controlling the casting distance of a casting lure attached to an end of the fishing line during a forward casting motion of a fishing rod containing the spool, said attachment comprising:

a pressure pad of one-piece construction having a curved first portion sized and curved to coaxially surround at least a portion of the distal lip to which the attachment is to be fixedly attached and an integral second portion extending laterally from said first portion and sized to extend outwardly from the distal lip to which the attachment is to be fixedly secured and means for connecting said first portion to the distal lip, and wherein during casting of the lure and the line, the line passes along an outer surface of said second portion, whereby a casting operator presses a casting finger on the line against said second portion, with varying intermittent finger pressure to increase and decrease drag on the line as the line spools off the spool, such that the lure will land at a desired distance; and wherein said second portion comprises a curved button, said first portion comprises a mounting tab and said means for connecting comprises an adhesive for affixing said mounting tab to the distal lip.

9. A spinning reel casting distance controller sized for affixation to a distal end of a spinning reel spool comprising:

a pressure pad attachment of one-piece construction having a curved first portion sized and curved to coaxially surround at least a portion of the distal end of the spool; an integral pressure pad portion extending laterally from the first portion and sized to extend outwardly from the distal end of the spool; and means for connecting said first portion to the distal end of the spool; and laterally from the first portion and sized to extend outwardly from the distal end of the spool; and means for connecting said first portion to the distal end of the spool; and wherein said pressure pad portion comprises a curved button; said first portion comprises an integral mounting tab; and said means for connecting comprises an adhesive for affixing said mounting tab to the distal lip of the spool.

10. A spinning reel casting distance controller sized for affixation to a distal end of a spinning reel spool comprising:

a pressure pad attachment of one-piece construction having a curved first portion sized and curved to coaxially surround at least a portion of the distal end of the spool; an integral pressure pad portion extending laterally from the first portion and sized to extend outwardly from the distal end of the spool; and means for connecting said first portion to the distal end of the spool;

wherein said first portion comprises a first ring and the pressure pad portion comprises a second integral ring; and wherein said first ring surrounds a distal lip of the spinning reel spool and wherein said first ring extends over the distal lip.

11. The controller of claim 10 wherein the first ring and the integral pressure pad portion are in a one-piece molded construction with the distal end of the spool.

12. In combination, a fishing rod, a spinning reel including a fishing line-carrying spool having a spin axis, said reel being attached to said rod, a fishing line spooled on the spool and a casting lure at a distal end of the fishing line, wherein the spool includes a distal lip confining spooled turns of the fishing line, and a spool distal end; and a pressure pad for controlling a spacing distance of the casting lure upon a forward casting motion of the rod, said pressure pad being fixedly connected to said spool distal lip and extending in a direction parallel to the spin axis of the spool and axially outwardly from said spool distal end, and wherein said pressure pad is located such that during casting of said casting lure and the fishing line, the fishing line on each revolution off said reel passes along an outer surface of said pressure pad, such that a casting person manually presses a casting finger on said fishing line against said pressure pad with varying intermittent finger pressure to increase and decrease drag on the fishing line as the fishing line spools off the spool and passes over said pressure pad, such that the casting lure will land at a desired distance; and wherein said pressure pad further includes a clasp ring, said pressure pad and said clasp ring being integrally formed and being in an interference fit with said spool distal lip.

* * * * *